US006467007B1

(12) United States Patent
Armstrong et al.

(10) Patent No.: US 6,467,007 B1
(45) Date of Patent: Oct. 15, 2002

(54) PROCESSOR RESET GENERATED VIA MEMORY ACCESS INTERRUPT

(75) Inventors: Troy David Armstrong, Rochester; William Joseph Armstrong, Kasson; Naresh Nayar, Rochester; Kenneth Charles Vossen, Kasson, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,769

(22) Filed: May 19, 1999

(51) Int. Cl.[7] .................. G06F 13/24; G06F 15/177; G06F 11/30; G06F 1/24
(52) U.S. Cl. .................. 710/260; 710/266; 711/166; 713/1; 714/23; 714/763
(58) Field of Search .................. 710/260, 261, 710/266; 709/215, 216; 712/216, 226, 244; 713/1, 100; 714/23, 701, 702, 763; 711/100, 147, 153, 166

(56) References Cited

U.S. PATENT DOCUMENTS

| 3,641,505 A | 2/1972 | Artz et al. | 340/172.5 |
| 4,511,964 A | 4/1985 | Georg et al. | 364/200 |

(List continued on next page.)

FOREIGN PATENT DOCUMENTS

| WO | 95/18998 | * 7/1995 | G06F/1/24 |

OTHER PUBLICATIONS

Abstract for JAPIO Application No. 94–103092, T. Imada et al., Apr. 15, 1994, "Virtual Computer System."
Abstract for JAPIO Application No. 92–348434, T. Imada et al., Dec. 3, 1992, "Virtual Computer System."
Inspec Abstract No. C9408–6110P–022, A. B. Gargaro et al., Mar. 1994, "Supporting Distribution and Dynamic Reconfiguration in AdaPT."
VMWare Virtual Platform—Technology White Paper, http:vmware.com/products/virtualplatform.html (1999).
IBM Technical Disclosure Bulletin Kreulen, "OS/2 Raw FileSystem," vol. 40, No. 05, pp. 177–190, May 1997.
IBM Technical Disclosure Bulletin, Baskey et al., "Highly Parallel Coupling Facility Emulator/Router with Shadowed Link Buffers," vol. 39, No. 12, pp. 123–124 Dec. 1996.
U.S. Patent Application RO999–021, "Apparatus and Method for Specifying Maximum Interactive Performance in a Logical Partition of a Computer System Independently from the Maximum Interactive Performance in Other Partitions," filed May 19, 1999, Armstrong et al.
U.S. Patent Application RO999–023, "Management of a Concurrent Use License in a Logically–Partitioned Computer," filed May 19, 1999, Armstong et al.
U.S. Patent Application RO999–024, "Event–Driven Communications Interface for Logically–Partitioned Computer," filed May 19, 1999, Armstrong et al.

(List continued on next page.)

Primary Examiner—Xuan M. Thai
(74) Attorney, Agent, or Firm—Wood, Herron & Evans, LLP (57) ABSTRACT

An apparatus, program product, and method utilize a memory access interrupt to effect a reset of a processor in a multi-processor environment. Specifically, a source processor is permitted to initiate a reset of a target processor simply by generating both a reset request and a memory access interrupt for the target processor. The target processor is then specifically configured to detect the presence of a pending reset request during handing of the memory access interrupt, such that the target processor will perform a reset operation responsive to detection of such a request.

33 Claims, 3 Drawing Sheets

U.S. PATENT DOCUMENTS

| | | | | |
|---|---|---|---|---|
| 4,601,008 A | * | 7/1986 | Kato | 710/260 |
| 4,843,541 A | | 6/1989 | Bean et al. | 364/200 |
| 4,924,378 A | | 5/1990 | Hershey et al. | 364/200 |
| 5,129,088 A | | 7/1992 | Auslander et al. | 395/700 |
| 5,204,897 A | | 4/1993 | Wyman | 380/4 |
| 5,253,344 A | | 10/1993 | Bostick et al. | 395/275 |
| 5,263,158 A | | 11/1993 | Janis | 395/600 |
| 5,297,287 A | * | 3/1994 | Miyayama et al. | 713/1 |
| 5,345,590 A | | 9/1994 | Ault et al. | 395/650 |
| 5,365,514 A | | 11/1994 | Hershey et al. | 370/17 |
| 5,375,206 A | | 12/1994 | Hunter et al. | |
| 5,446,902 A | | 8/1995 | Islam | 395/700 |
| 5,465,360 A | * | 11/1995 | Miller et al. | 713/1 |
| 5,526,488 A | | 6/1996 | Hershey et al. | 395/200.2 |
| 5,550,970 A | | 8/1996 | Cline et al. | 395/161 |
| 5,566,337 A | | 10/1996 | Szymanski et al. | 395/733 |
| 5,574,914 A | | 11/1996 | Hancock et al. | 395/650 |
| 5,600,805 A | | 2/1997 | Fredericks et al. | 395/825 |
| 5,659,756 A | | 8/1997 | Hefferon et al. | 395/726 |
| 5,659,786 A | | 8/1997 | George et al. | 395/653 |
| 5,671,405 A | | 9/1997 | Wu et al. | 395/607 |
| 5,675,791 A | | 10/1997 | Bhide et al. | 395/621 |
| 5,684,974 A | | 11/1997 | Onodera | 395/412 |
| 5,687,363 A | | 11/1997 | Oulid-Aissa et al. | 395/604 |
| 5,692,174 A | | 11/1997 | Birely et al. | 395/603 |
| 5,692,182 A | | 11/1997 | Desai et al. | 395/610 |
| 5,742,757 A | | 4/1998 | Hamadani et al. | 395/186 |
| 5,784,625 A | * | 7/1998 | Walker | 710/260 |
| 5,819,061 A | | 10/1998 | Glassen et al. | 395/406 |
| 5,828,882 A | | 10/1998 | Hinckley | 395/680 |
| 5,845,146 A | | 12/1998 | Onodera | 395/822 |
| 5,923,890 A | | 7/1999 | Kubala et al. | 395/800.01 |
| 5,948,065 A | | 9/1999 | Eilert et al. | 709/226 |
| 5,978,857 A | | 11/1999 | Graham | 709/301 |
| 5,996,026 A | | 11/1999 | Onodera et al. | 710/3 |
| 6,021,438 A | | 2/2000 | Duvvoori et al. | 709/224 |
| 6,061,695 A | | 5/2000 | Slivka et al. | 707/513 |
| 6,075,938 A | | 6/2000 | Bugnion et al. | 395/500.48 |
| 6,148,323 A | | 11/2000 | Whitner et al. | 709/105 |
| 6,173,337 B1 | | 1/2001 | Akhond et al. | 709/318 |
| 6,199,179 B1 | | 3/2001 | Kauffman et al. | 714/26 |
| 6,247,109 B1 | | 6/2001 | Kleinsorge et al. | 712/13 |
| 6,263,359 B1 | | 7/2001 | Fong et al. | 709/103 |
| 6,269,391 B1 | | 7/2001 | Gillespie | 709/100 |
| 6,269,409 B1 | | 7/2001 | Solomon | 709/329 |
| 6,282,560 B1 | | 8/2001 | Eilert et al. | 709/100 |

OTHER PUBLICATIONS

U.S. Patent Application RO999–025, "Logical Partition Manager and Method," filed May 19, 1999, Armstrong et al.

Hauser, Ralf, "Does licensing require new access control techniques?", *Communications of the ACM,* vol. 37, No. 11, (Nov. 1994), pp. 48–55; Dialog copy pp. 1–10.

McGilton, Henry et al., *Introducing the UNIX System,* R.R. Donnelly & Sons Company, (1983), pp. 515–521.

Gomes, Lee, "Desktops to get OS freedom of choice," Wall Street Journal Online, Mar. 26, 1999.

VMWare 1.0x for Linux Changelog Archive (1999).

* cited by examiner

PROCESSOR RESET GENERATED VIA MEMORY ACCESS INTERRUPT

RELATED APPLICATIONS

This patent application is related to the following patent applications: U.S. patent application Ser. No. RO999-021, entitled "Apparatus and Method for Specifying Maximum Interactive Performance in a Logical Partition of a Computer System Independently from the Maximum Interactive Performance in Other Partitions," Ser. No. 09/314,541 filed May 19, 1999 by Armstrong et al.; U.S. patent application Ser. No. RO999-023, entitled "Management of a Concurrent Use License in a Logically-Partitioned Computer," Ser. No. 09/314,324 filed May 19, 1999 by Armstrong et al.; U.S. patent application Ser. No. RO999-024, entitled "Event-Driven Communications Interface for Logically-Partitioned Computer," Ser. No. 09/4314,187 filed May 19, 1999 by Armstrong et al.; and U.S. patent application Ser. No. RO999-025, entitled "Logical Partition Manager and Method," Ser. No. 09/314,214 filed May 19, 1999 by Armstrong et al.

FIELD OF THE INVENTION

The invention is generally related to computers and computer software. In particular, the invention is generally related to initiating a reset of a computer processor via a software-based mechanism.

BACKGROUND OF THE INVENTION

Computer technology continues to advance at a rapid pace, with significant developments being made in both software and in the underlying hardware upon which such software executes. One significant advance in computer technology is the development of multi-processor computers, where multiple computer processors are interfaced with one another to permit multiple operations to be performed concurrently, thus improving the overall performance of such computers. Also, a number of multi-processor computer designs rely on logical partitioning to allocate computer resources to further enhance the performance of multiple concurrent tasks.

With logical partitioning, a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software executing on the logical partition, operates as a fully independent computer.

A shared resource, often referred to as a "hypervisor" or partition manager, manages the logical partitions and facilitates the allocation of resources to different logical partitions. As a component of this function, a partition manager maintains separate virtual memory address spaces for the various logical partitions so that the memory utilized by each logical partition is fully independent of the other logical partitions. One or more address translation tables are typically used by a partition manager to map addresses from each virtual address space to different addresses in the physical, or real, address space of the computer. Then, whenever a logical partition attempts to access a particular virtual address, the partition manager translates the virtual address to a real address so that the shared memory can be accessed directly by the logical partition.

A primary benefit of multi-processor computers, and in particular of those implementing partitioned environments, is the ability to maintain at least partial operational capability in response to partial system failures. For example, while most computers, and in particular most multi-processor computers, are relatively reliable, the processors in such computers can "hang" from time to time and cease to operate in responsive and predictable manners, e.g., due to software design flaws, or "bugs", that cause such processors to operate continuously in endless loops. In a partitioned environment in particular, hanging a processor allocated to a particular logical partition often results in that partition becoming at least partially inoperative and non-responsive. However, other logical partitions that do not rely on the hung processor are typically not affected by the failure.

While it may be acceptable in some situations to permit a computer to simply be powered off and on to recover from a hung processor, in many situations it is more desirable to provide the ability for a hung processor to be reset, or restored to a known state, in such a manner that the entire computer does not need to be shut down. Also, in a multi-processor computer, and in particular one that implements a partitioned environment, it is often desirable for such a reset operation to not affect other processors and/or other logical partitions operating in the computer so that the other processors and/or logical partitions can still perform useful operations while the hung processor is reset.

In many multi-processor computers, and in particular in those implementing partitioned environments, a software-based reset mechanism is typically supported to permit one processor to initiate a reset of another processor. Typically, a software-based reset mechanism relies on the use of interrupts, often referred to as inter-processor interrupts (IPI's), to cause a hung processor to reset and restore itself to a known state. An IPI, like all interrupts, causes a processor to cease all current operations and immediately jump to dedicated program code, referred to as an "interrupt handler", to handle the interrupt.

An IPI is typically handled as an "external" interrupt insofar as an IPI is initiated externally from the processor that receives the interrupt. Most processors, however, support the ability to selectively enable or disable external interrupts so that such interrupts will be ignored—typically when a processor is executing relatively critical program code that should not be terminated prior to completion. The ability to disable external interrupts, however, introduces the possibility that a processor may hang while external interrupts are disabled, and thus be incapable of being reset through an IPI. Should this occur, the only manner of resetting the processor would likely be a hardware reset, which would typically necessitate a full restart of the computer, and a consequent temporary inaccessibility of the computer.

Therefore, a significant need exists for an alternate software-based reset mechanism for a processor that permits the processor to be reset in wider range of situations, and in particular, for a software-based reset mechanism for a processor that cannot be defeated as a result of the disabling of interrupts on the processor.

SUMMARY OF THE INVENTION

The invention addresses these and other problems associated with the prior art by providing an apparatus, program product, and method that utilize a memory access interrupt to effect a reset of a processor in a multi-processor environment. Specifically, one processor (referred to herein as a source processor) is permitted to initiate a reset of another processor (referred to herein as a target processor) simply by generating both a reset request and a memory access interrupt for the target processor. The target processor is then specifically configured to detect the presence of a pending reset request during handing of the memory access interrupt, such that the target processor will perform a reset operation responsive to detection of such a request.

Detection of a reset request is typically implemented within an interrupt handler that is executed by a target processor in response to a memory access interrupt. As a result, for those situations in which a memory access interrupt is generated for a reason other than to initiate a reset of the target processor, the target processor can handle the interrupt in an appropriate manner, and often with little additional overhead associated with determining whether a reset operation should be performed as a result of the interrupt.

A memory access interrupt may be considered to include any type of interrupt that is generated responsive to a memory access attempt by the target processor. Particularly given the general necessity for a processor to always be capable of accessing memory, a memory access interrupt is often further characterized as being incapable of being disabled during the operation of the target processor. As a consequence, unlike external interrupts such as IPI's and the like which are capable of being disabled in some instances, a reset operation can be initiated on a target processor via a memory access interrupt irrespective of whether other interrupts are disabled on the processor.

While other alternative memory access interrupt implementations may also be utilized consistent with the invention, one particularly useful implementation relies on a type of memory access interrupt that is generated in response to an attempt by a target processor to access a virtual memory address in a virtual memory address space that is not mapped by any entry in an address translation table. Generation of a memory access interrupt then typically requires only that one or more entries in the address translation table be invalidated to ensure that a subsequent access to the virtual memory address space will attempt to access an unmapped virtual memory address.

Therefore, consistent with one aspect of the invention, a processor may be reset by generating a reset request for the processor, generating a memory access interrupt on the processor, and resetting the processor during handling of the memory access interrupt by the processor responsive to detection of the reset request.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware and Software Environment

Figure 1:
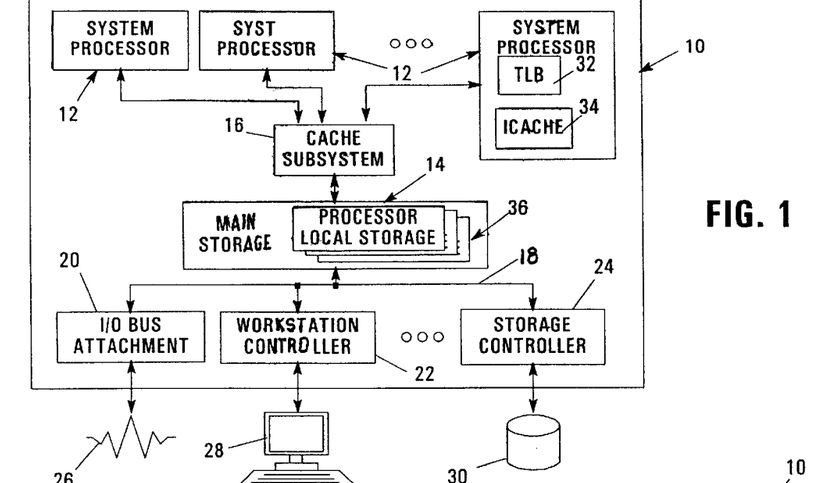
FIG. 1 is a block diagram of a computer consistent with the invention.

Turning to the Drawings, wherein like numbers denote like parts throughout the several views, FIG. 1 illustrates a data processing apparatus or computer 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as the AS/400 series computer available from International Business Machines Corporation.

Apparatus 10 generally includes a plurality of system processors 12 coupled to a memory subsystem including main storage 14, e.g., an array of dynamic random access memory (DRAM). System processors 12 may be configured, for example, to implement a symmetric multiprocessing (SMP) environment, among other possible multi-processor environments. Also illustrated as interposed between processors 12 and main storage 14 is a cache subsystem 16, typically including one or more levels of data, instruction and/or combination caches, with certain caches either serving individual processors or multiple processors as is well known in the art. Furthermore, main storage 14 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

Figure 2:
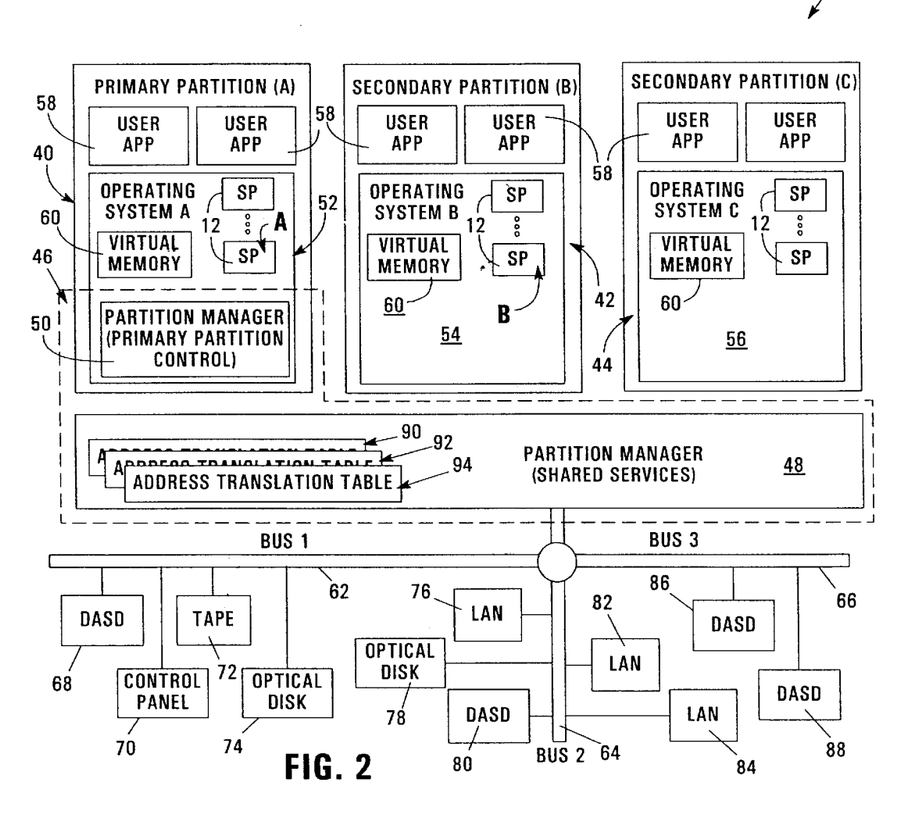
FIG. 2 is a block diagram of the primary software components and resources in the computer of FIG. 1.

In the illustrated embodiment, computer 10 is implemented as a logically partitioned computer. In this regard, FIG. 2 illustrates in greater detail the primary software components and resources utilized in implementing a logically partitioned computing environment on computer 10, including a plurality of logical partitions 40, 42, 44 managed by a partition manager 46. Any number of logical partitions may be supported as is well known in the art. Moreover, it will be appreciated that the invention may be utilized in other partitioned environments, as well as in other computers (e.g., non-partitioned computers) that utilize multiple processors.

In the illustrated implementation, logical partition 40 operates as a primary partition, while logical partitions 42 and 44 operate as secondary partitions. A primary partition in this context shares some of the partition management functions for the computer, such as handling the powering on or powering off of the secondary logical partitions on computer 10, or initiating a memory dump of the secondary logical partitions. As such, a portion of partition manager 46 is illustrated by primary partition control block 50, disposed in the operating system 52 resident in primary partition 40. Other partition management services, which are accessible by all logical partitions, are represented by shared services block 48. Implementation of partition management functionality within a primary logical partition is described, for example, in U.S. patent application Ser. No. RO999-025, entitled "Logical Partition Manager and Method, Ser. No. 09/314,214, filed on May 19, 1999 by Armstrong et al., which is incorporated by reference herein. However, partition management functionality need not be implemented within any particular logical partition in other implementations consistent with the invention.

Each logical partition utilizes an operating system, e.g., operating systems 52, 54 and 56 for logical partitions 40, 42 and 44, respectively), that controls the primary operations of the logical partition in the same manner as the operating system of a non-partitioned computer. For example, each operating system 52–56 may be implemented using the OS/400 operating system available from International Business Machines Corporation, among others, residing on top of a kernel, e.g., AS/400 system licensed internal code (SLIC). The shared services in block 48 are alternatively referred to herein as partition licensed internal code (PLIC). Also illustrated are several user applications 58 that execute on each logical partition 40–44 and rely on the underlying services provided by the operating systems thereof.

Each logical partition 40–44 executes in a separate memory space, represented by virtual memory 60. Moreover, each logical partition 40–44 is statically and/or dynamically allocated a portion of the available resources in computer 10. For example, each logical partition is allocated one or more processors 12, as well as a portion of the available memory space for use in virtual memory 60. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the like, are typically allocated to one or more logical partitions in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 62, 64 and 66, with a plurality of resources on bus 62, including a direct access storage device (DASD) 68, a control panel 70, a tape drive 72 and an optical disk drive 74, allocated to primary logical partition 40. Bus 64, on the other hand, may have resources allocated on a resource-by-resource basis, e.g., with local area network (LAN) adaptor 76, optical disk drive 78 and DASD 80 allocated to secondary logical partition 42, and LAN adaptors 82 and 84 allocated to secondary logical partition 44. Bus 66 may represent, for example, a bus allocated specifically to logical partition 44, such that all resources on the bus, e.g., DASD's 86 and 88, are allocated to the same logical partition.

It will be appreciated that the illustration of specific resources in FIG. 2 is merely exemplary in nature, and that any combination and arrangement of resources may be allocated to any logical partition in the alternative. Moreover, it will be appreciated that in some implementations resources can be reallocated on a dynamic basis to service the needs of other logical partitions. Furthermore, it will be appreciated that resources may also be represented in terms of the input/output processors (IOP's) used to interface the computer with the specific hardware devices.

The various software components and resources illustrated in FIG. 2 and implementing the embodiments of the invention may be implemented in a number of manners, including using various computer software applications, routines, components, programs, objects, modules, data structures, etc., referred to hereinafter as "computer programs", or simply "programs". The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention. Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of signal bearing medium used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Processor Reset Via Memory Access Interrupt

The embodiments described hereinafter generally operate by utilizing the existing memory access interrupt handling functionality of a processor to initiate a reset of the processor. A memory access interrupt can generally be considered to include any type of interrupt that is generated responsive to a memory access attempt by a processor. For example, in the implementation discussed hereinafter, a memory access interrupt is implemented as either or both of a data storage interrupt and instruction storage interrupt that is generated whenever a processor attempts to access a virtual memory address in a virtual memory address space that is not mapped to any real memory address by an address translation table utilized by that processor. However, it will be appreciated that memory access interrupts may be generated in other manners consistent with the invention, e.g., in response to a miss of a translation lookaside buffer, among others.

A number of existing hardware and software components in computer 10 are specifically utilized when initiating a processor reset in the manner disclosed herein. For example, as shown in FIG. 2, one or more address translation tables, e.g., address translation tables 90, 92 and 94 (also referred to as hardware page tables (HPT's)) are provided in partition manager 46 to respectively handle the virtual to real address translation operations for logical partitions 40, 42 and 44, respectively. Moreover, as shown in FIG. 1, each processor 12 optionally includes a translation lookaside buffer (TLB)

32 or other cache structure that caches at least a portion of one or more address translation tables to accelerate the translation of virtual to real memory addresses, in a manner well known in the art.

Each processor 12 typically also includes one or more levels of instruction cache, e.g., level one instruction cache (ICache) 34, within which one or more cache lines are stored. Other relevant cache structures may also be found in cache subsystem 16. Furthermore, as illustrated at 36, at least a portion of main storage is allocated for local storage for one or more processors, which local storage is statically allocated to a fixed region of memory addresses to permit persistent access to the local storage at all times.

To initiate a processor reset in the manner described herein, a first processor (referred to herein as a "source processor"), which desires to initiate a processor reset of another processor (referred to herein as a "target processor"), typically must generate a reset request and a memory access interrupt for the target processor. In FIG. 2, an exemplary source processor allocated to primary logical partition 40 is illustrated at "A", and an exemplary target processor allocated to secondary logical partition 42 is illustrated at "B". However, it should be appreciated that source and target processors may be allocated to the same logical partition in some implementations.

In the illustrated embodiment, generation of a reset request is implemented via setting a flag located at a static memory location in the local storage for the target processor. The reset flag may alternatively be implemented in any other memory storage device that is accessible (at least indirectly) to both the source and target processors. Moreover, other manners of generating a reset request or otherwise indicating to a target processor that a reset is requested will be appreciated by one of ordinary skill in the art having the benefit of the instant disclosure.

Also in the illustrated embodiment, generation of a memory access interrupt is implemented by invalidating, with the source processor, every entry in an address translation table associated with the target processor. Doing so ensures that the next time the target processor attempts to access any memory address (be it to retrieve a next instruction or to access data stored in memory), a memory access interrupt will be generated. In addition, to maintain coherency, it is desirable to update any caching mechanisms (such as TLB's) to invalidate any cached entries from an invalidated address translation table, and/or to update any other caching mechanisms that cache data and/or instructions associated with any such invalidated entries.

In other embodiments, it may not be necessary to invalidate every entry of an address translation table. For example, it may be possible in some embodiments to invalidate entries one at a time until a memory access interrupt is detected by the source processor. It may also be possible in some implementations to predict which entry will be accessed next, and only invalidate that entry. Furthermore, in other embodiments different caching mechanisms may or may not need to be updated to maintain coherency.

In addition, other mechanisms for generating a memory access interrupt may be utilized consistent with the invention. For example, as discussed above, a memory access interrupt may be initiated by generating a miss on a translation lookaside buffer or other address translation data caching structure.

Other alternatives will be apparent to one of ordinary skill in the art.

Figure 3:
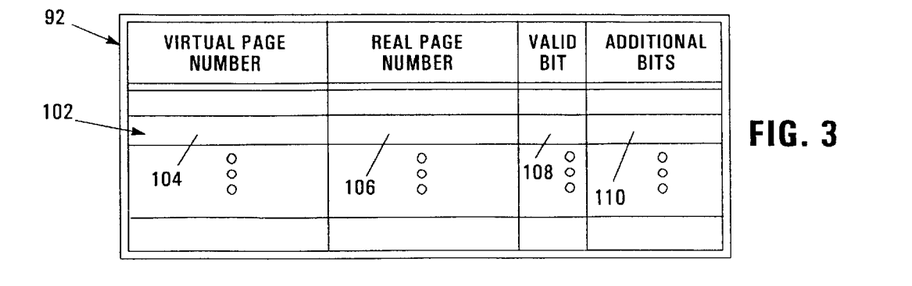
FIG. 3 is a block diagram of an address translation table in FIG. 2.

FIG. 3 illustrates in greater detail a suitable implementation of address translation table 92 allocated to logical partition 42 and used by target processor B (FIG. 2). As is well known in the art, an address translation table includes a plurality of entries, e.g., entry 102, including a plurality of fields 104, 106, 108 and 110. Address translation in the illustrated embodiment occurs on a page-by-page basis, e.g., with a page size of 4096 bytes. Each entry 102 thus matches a page of virtual memory address to a corresponding page of real memory addresses in the memory system. The "page" of a memory address is typically identified by those bits from the memory address other than the lowest order number of bits corresponding to the page size. Thus, for a page size of 4096, as well as a 64-bit memory address space, a page is identified by the upper 42 bits (bits 0–41, where bit 0 is the MSB), with the low order 12 bits (bits 42–63) utilized to specify a particular memory address in an identified page. As such, in the illustrated implementation, field 104 of each entry 102 includes a 42-bit virtual page number, with entry 106 including a 42-bit real page number to which the virtual page is mapped. It should be appreciated that either or both of the virtual and real memory address spaces may have differing sizes consistent with the invention.

Each entry 102 further includes a valid field 108 storing a bit that indicates whether or not the entry represents a valid mapping of a virtual page to a real page. It is this bit that is cleared by a source processor whenever it is desired to generate a memory access interrupt on a target processor that utilizes address translation table 92.

Additional information, represented by field 110, may also be stored within an entry 102 in an address translation table 92. Typically, such additional information includes various protection bits, as well as reference, change, address compare and/or other information known in the art. It should be appreciated that other data structures may be utilized in an address translation scheme consistent with the invention.

Figure 4:
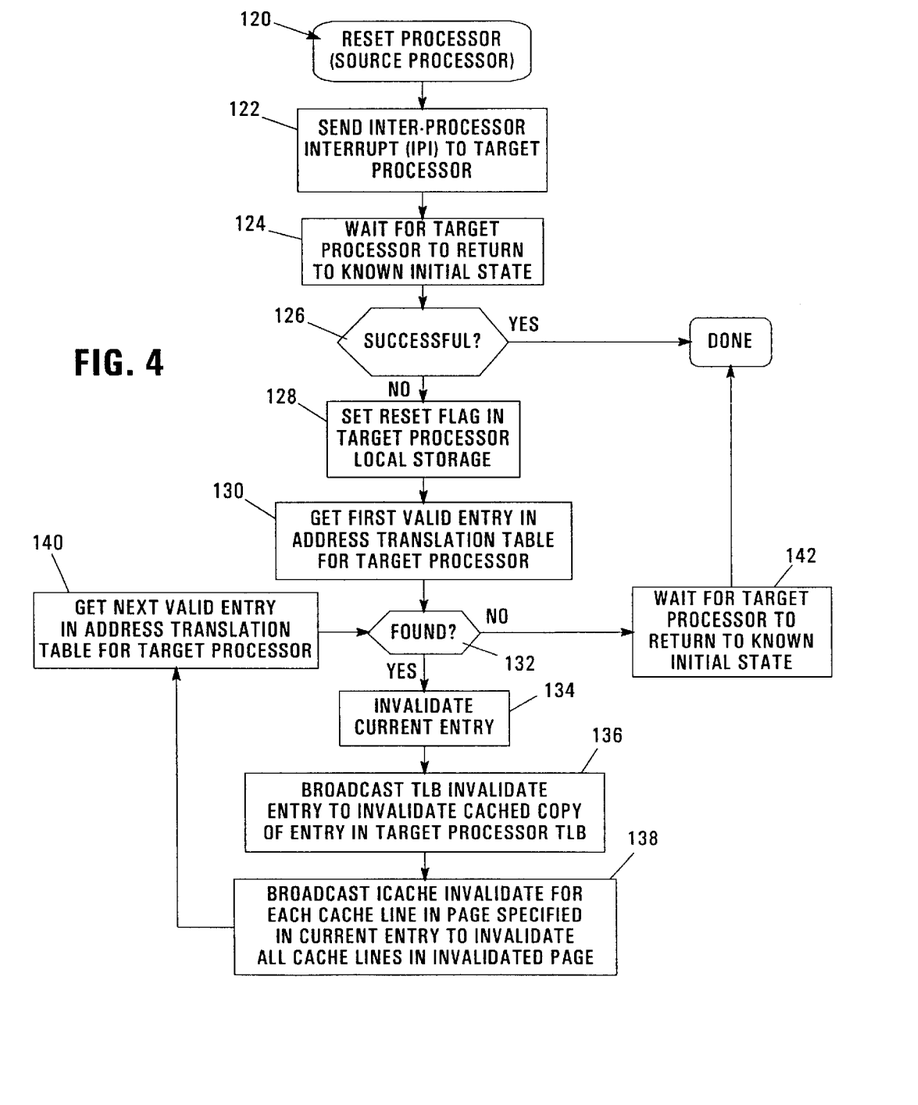
FIG. 4 is a flowchart illustrating the program flow of a reset processor routine executed by a source processor in the computer of FIGS. 1 and 2.

FIG. 4 next illustrates a reset processor routine 120, executed by a source processor whenever it is desirable to reset a target processor to an initial state. Routine 120 may be called, for example, whenever it is detected that a processor, or a logical partition associated with that processor, has become non-responsive (here, after an unsuccessful IPI). Other situations in which it may be desirable to reset a processor include power off, main store dump, and continuously powered mainstore (CPM) initial program load (IPL) of a secondary partition, among others.

First, as shown at block 122, the source processor may attempt to send an inter-processor interrupt (IPI) to the target processor, in a manner known in the art. Next, the processor waits at block 124 for the target processor to return to a known initial state, e.g., by setting a timer and periodically checking the responsiveness of the target processor. In such an implementation, expiration of the timer without a response from the target processor would indicate an unsuccessful reset operation.

Next, in block 126, it is determined whether the target processor has returned to its known initial state. If so, routine 120 is complete. If not, however, control passes to 128 to perform memory access-based processor reset consistent with the invention.

Specifically, in block 128, the source processor sets a reset flag in the local storage for the target processor to be reset. Next, in block 130, the source processor attempts to retrieve the first valid entry in the address translation table allocated to the target processor. Assuming such an entry is found, block 132 passes control to block 134 to invalidate the current entry, typically by clearing the valid bit therefor. Next, in block 136, any copy of the entry in the translation lookaside buffer (TLB) for the target processor is invalidated by broadcasting a TLB invalidate entry message, the use and configuration of which is well understood in the art.

Next, in block 138, all of the cache lines in the page that is being invalidated are invalidated in the target processor's instruction cache by broadcasting an instruction cache block invalidate (ICBI) instruction for each cache line referenced in the page. The use and operation of an ICBI instruction are well understood in the art.

Blocks 136 and 138 essentially maintain coherency between the address translation table and any cached copies of any entries referenced thereby, as well as any cached copies of cache lines incorporated within any invalidated pages. It should be appreciated, however, that in other embodiments, coherency issues may not be present, and either or both of blocks 136 or 138 may be omitted.

After broadcast of the ICBI instructions, control passes to block 140 to attempt to obtain the next valid entry in the address translation table associated with the target processor. Control then returns to block 132 to determine whether another such entry was found. Processing then continues until each valid entry in the address translation table has been invalidated. Once all such entries have been processed, block 132 passes control to block 142 to wait for the target processor to return to its known initial state. After this occurs, routine 120 is complete.

Implementation of the functionality of routine 120 is typically within program code allocated to partition manager 46 (FIG. 2), principally within shared services block 48. Specifically, block 50 in the primary logical partition portion of the partition manager determines whenever a processor needs to be reset, and initiates routine 120 in shared services block 48 to implement such a reset. Other allocations of functionality between blocks 48 and 50 may be used in the alternative, however.

It should be appreciated that additional modifications may be made to routine 120 consistent with the invention. For example, rather than searching for only valid entries, all entries of an address translation table may be processed in the manner disclosed herein. Moreover, it may not be necessary or desirable in some embodiments to attempt an IPI prior to a memory access-based interrupt. Moreover, waiting for the target processor to return to its known initial state, as disclosed in connection with blocks 124 and 142 may be performed in a number of alternate manners, including setting a watchdog timer, etc. Other modifications will be apparent to one of ordinary skill in the art.

Figure 5:
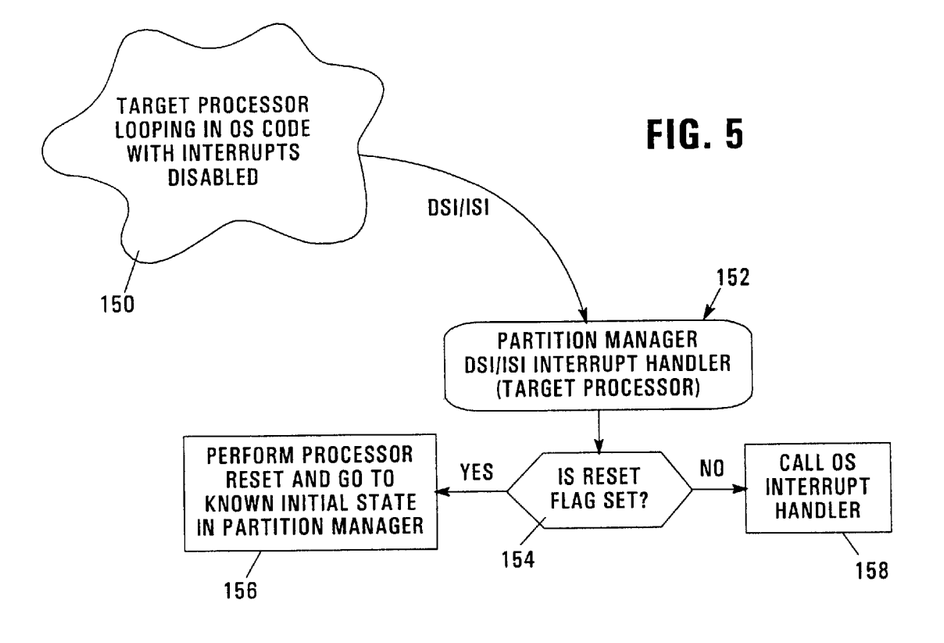
FIG. 5 is a flowchart illustrating the program flow of a partition manager interrupt handler executed by a target processor in the computer of FIGS. 1 and 2, in response to a memory access interrupt.

FIG. 5 next illustrates the initiation of a processor reset by the target processor in response to the generation of a memory access interrupt by the source processor (described above in connection with FIG. 4). As shown at 150, the target processor is illustrated as looping in operating system code with its interrupts disabled. In response to a data storage interrupt or instruction storage interrupt, control passes to a partition manager DSI/ISI interrupt handler 152 executed by the target processor. Routine 152 is initiated any time a memory access interrupt is generated on the target processor, irrespective of whether the memory access interrupt was generated in response to a request to reset the processor. As such, routine 152 begins in block 154 by determining whether the reset flag allocated to the target processor in the local storage therefor is set. If so, control passes to block 156 to perform a processor reset and go to a known initial state in the partition manager code, in a manner well understood in the art. By returning to such a known initial state, the reset is achieved, in a manner specifically adapted for the particular configuration of computer 10.

Returning to block 154, if the reset flag is not set, the memory access interrupt is handled in a conventional manner, e.g., by passing control to block 158 to call an interrupt handler in the operating system code, as is also well known in the art. Typically, handling of such an interrupt includes determining whether the requested virtual address is valid, and if so, retrieving a real address from the operating system's software page table. Then, the retrieved real address is stored in the address translation table in the partition manager, and normal processing is resumed. If the virtual address is not a valid address for the logical partition, an exception is created, which is handled in the operating system in a manner understood in the art.

Various additional modifications may be made consistent with the invention. For example, other manners of insuring coherency between an address translation table and other components in the computer may be used in the alternative.

Other modifications may be made to the illustrated embodiments without departing from the spirit and scope of the invention. Therefore, the invention lies in the claims hereinafter appended.

What is claimed is:

1. A method of resetting a processor, comprising:
   (a) generating a reset request for the processor;
   (b) generating a memory access interrupt on the processor; and
   (c) resetting the processor during handling of the memory access interrupt by the processor responsive to detection of the reset request.

2. The method of claim 1, further comprising accessing data with the processor using a virtual memory system accessible through an address translation table associated with the processor, and wherein generating the memory access interrupt includes invalidating at least one entry in the address translation table.

3. The method of claim 2, wherein invalidating at least one entry in the address translation table includes invalidating every entry in the address translation table.

4. The method of claim 3, wherein generating the memory access interrupt further includes invalidating a corresponding entry in a translation table cache associated with the processor.

5. The method of claim 4, wherein generating the memory access interrupt further includes invalidating a cache entry, associated with a cache line referenced by an invalidated entry in the address translation table, and located in a cache associated with the processor.

6. The method of claim 1, wherein the address translation table includes a plurality of entries, with each entry identifying a virtual memory address used by the processor and a real memory address mapped to the virtual memory address.

7. The method of claim 1, wherein generating the reset request includes setting a reset flag.

8. The method of claim 7, wherein the reset flag is stored in a local storage area for the processor.

9. The method of claim 7, further comprising detecting the reset request in the processor by accessing the reset flag.

10. The method of claim 1, wherein the memory access interrupt includes at least one of a data storage interrupt and an instruction storage interrupt.

11. The method of claim 1, wherein resetting the processor during handling of the memory access interrupt responsive to detection of the reset request is performed by a memory access interrupt routine executed by the processor responsive to a memory access interrupt.

12. The method of claim 11, wherein generating the reset request and generating the memory access interrupt are performed on a second processor coupled to the first processor.

13. The method of claim 12, wherein the first and second processors are among a plurality of processors in a multiprocessor computer system.

14. The method of claim 13, wherein the multi-processor computer system defines a plurality of partitions, each partition including an operating system executing on at least one of the plurality of processors, the multi-processor computer system further including a partition manager executing on at least one of the plurality of processors, wherein generating the reset request and generating the memory access interrupt are performed by the partition manager.

15. The method of claim 1, further comprising detecting whether the processor may be locked up with external interrupts disabled, wherein generating the reset request and generating the memory access interrupt are performed responsive to detecting that the processor may be locked up with external interrupts disabled.

16. The method of claim 1, wherein generating the reset request and generating the memory access interrupt are performed responsive to determining that an attempt to reset the processor using an inter-processor interrupt was unsuccessful after determining that the processor is locked up.

17. A method of resetting a first processor among a plurality of processors in a multi-processor computer system, comprising:
   (a) detecting with a processor other than the first processor a likely lockup condition in the first processor while external interrupts on the first processor are disabled;
   (b) generating with a processor other than the first processor a reset request for the first processor;
   (c) generating with a processor other than the first processor a memory access interrupt on the first processor; and
   (d) handling the memory access interrupt in the first processor, including detecting the reset request with the first processor and performing a reset on the first processor responsive thereto.

18. An apparatus comprising first and second processors, wherein:
   (a) the second processor is configured to initiate a reset of the first processor by generating a reset request and a memory access interrupt for the first processor; and
   (b) the first processor is configured to handle the memory access interrupt and to perform a reset responsive to detection of the reset request during handling of the memory access interrupt.

19. The apparatus of claim 18, wherein the first processor is further configured to access data from a memory using an address translation table associated with the first processor, and wherein the second processor is configured to generate the memory access interrupt by invalidating at least one entry in the address translation table.

20. The apparatus of claim 19, the second processor is configured to generate the memory access interrupt by invalidating every entry in the address translation table.

21. The apparatus of claim 20, further comprising a translation table cache associated with the first processor, wherein the second processor is further configured to invalidate a corresponding entry in the translation table cache.

22. The apparatus of claim 21, further comprising a cache associated with the first processor, wherein the second processor is further configured to invalidate a cache entry in the cache that is associated with a cache line referenced by an invalidated entry in the address translation table.

23. The apparatus of claim 22, wherein the cache is a level one instruction cache.

24. The apparatus of claim 18, wherein the second processor is configured to generate the reset request by setting a reset flag, and wherein the first processor is configured to detect the reset request by determining whether the reset flag is set.

25. The apparatus of claim 18, wherein the memory access interrupt includes at least one of a data storage interrupt and an instruction storage interrupt.

26. The apparatus of claim 18, wherein the first processor is configured to execute a memory access interrupt routine responsive to the memory access interrupt, and to detect the reset request during execution of the memory access interrupt routine.

27. The apparatus of claim 18, wherein the first and second processors are among a plurality of processors in a multi-processor computer system, wherein the multi-processor computer system defines a plurality of partitions, each partition including an operating system executing on at least one of the plurality of processors, the multi-processor computer system further including a partition manager executing on at least the second processor.

28. The apparatus of claim 18, wherein the second processor is configured to detect whether the first processor may be locked up with external interrupts disabled, and to generate the reset request and the memory access interrupt responsive to detecting that the first processor may be locked up with external interrupts disabled.

29. The apparatus of claim 18, wherein the second processor is configured to generate the reset request and the memory access interrupt responsive to determining that an attempt to reset the first processor using an inter-processor interrupt was unsuccessful.

30. An apparatus, comprising:
   (a) a memory defining a real address space with a plurality of real memory addresses;
   (b) a first processor configured to access the memory using a virtual address space including a plurality of virtual memory addresses;
   (c) an address translation table accessible by the first processor and including a plurality of entries, each entry configured to map a virtual memory address in the virtual address space to a real memory address in the real address space;
   (d) a memory access interrupt handler configured to be executed by the first processor in response to an attempt by the first processor to access an unmapped virtual memory address in the address translation table, the memory access interrupt handler further configured to reset the first processor responsive to a pending reset request; and
   (e) a second processor coupled to the first processor, the second processor configured to initiate a reset of the first processor by generating a reset request and invalidating at least one entry in the address translation table.

31. The apparatus of claim 30, wherein the plurality of processors are configured to implement a partitioned environment including a plurality of logical partitions.

32. A program product, comprising:
   (a) first and second programs respectively configured to execute on first and second processors, the second program configured to initiate a reset of the first processor by generating a reset request and a memory access interrupt for the first processor, and the first program configured to handle the memory access interrupt and to perform a reset responsive to detection of the reset request during handling of the memory access interrupt; and
   (b) a signal bearing medium bearing the first and second programs.

33. The program product of claim 32, wherein the signal bearing medium includes at least one of a recordable medium and a transmission-type medium.

* * * * *